US009191410B2

(12) United States Patent
Jerichow

(10) Patent No.: US 9,191,410 B2
(45) Date of Patent: Nov. 17, 2015

(54) METHOD AND APPARATUS FOR ENHANCING COMMUNICATION SECURITY

(71) Applicant: NOKIA SOLUTIONS AND NETWORKS OY, Espoo (FI)

(72) Inventor: Anja Jerichow, München (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 6 days.

(21) Appl. No.: 14/153,628

(22) Filed: Jan. 13, 2014

(65) Prior Publication Data

US 2015/0200965 A1 Jul. 16, 2015

(51) Int. Cl.
*G06F 17/00* (2006.01)
*H04L 29/06* (2006.01)

(52) U.S. Cl.
CPC ........................................ *H04L 63/20* (2013.01)

(58) Field of Classification Search
CPC ........... G08B 13/2462; G08B 13/2482; H04L 2209/805; H04L 9/3273; H04L 63/20; H04Q 2213/095; G06F 21/604
USPC .......................................................... 726/1
See application file for complete search history.

(56) References Cited

U.S. PATENT DOCUMENTS

| 2009/0070586 A1* | 3/2009 | Bucker et al. ................. 713/171 |
| 2014/0086211 A1* | 3/2014 | Liu ............................... 370/331 |

OTHER PUBLICATIONS

3GPP TS 33.246 V11.2.0 (Jun. 2013); 3rd Generation Partnership Project;Technical Specification Group Services and System Aspects;3G Security;Security of Multimedia Broadcast/Multicast Service (MBMS) (Release 11).
3GPP TS 26.346 V12.0.0 (Dec. 2013); 3rd Generation Partnership Project; Technical Specification Group Services and System Aspects; Multimedia Broadcast/Multicast Service (MBMS);Protocols and codecs (Release 12).
3GPP TS 23.246 V12.0.0 (Dec. 2013); 3rd Generation Partnership Project; Technical Specification Group Services and System Aspects; Multimedia Broadcast/Multicast Service (MBMS); Architecture and functional description (Release 12).
3GPP TS 22.468 V12.0.0 (Jun. 2013); 3rd Generation Partnership Project; Technical Specification Group Services and System Aspects; Group Communication System Enablers for LTE (GCSE_LTE) (Release 12).
3GPP TS 22.146 V11.1.0 (May 2013); 3rd Generation Partnership Project; Technical Specification Group Services and System Aspects; Multimedia Broadcast/Multicast Service (MBMS); Stage 1 (Release 11).
3GPP TR 23.768 V1.0.0 (Dec. 2013); 3rd Generation Partnership Project; Technical Specification Group Services and System Aspects; Study on architecture enhancements to support Group Communication System Enablers for LTE (GCSE_LTE) (Release 12).

(Continued)

*Primary Examiner* — Dant Shaifer Harriman
*Assistant Examiner* — Abiy Getachew
(74) *Attorney, Agent, or Firm* — Squire Patton Boggs (US) LLP

(57) ABSTRACT

A method and apparatus can be configured to transmit indicators to a network entity. The indicators indicate whether security will be applied to a media data, whether security will be applied by an application layer, and whether security will be applied by an evolved-packet-system layer. The method can also include transmitting the media data to the network entity.

18 Claims, 12 Drawing Sheets

(56) References Cited

OTHER PUBLICATIONS (S3-131129) 3GPP TR 33.8ab V0.1.0 (Nov. 2013); 3rd Generation Partnership Project; Technical Specification Group Services and System Aspects; Study on security issues to support Group Communication System Enablers for LTE (GCSE_LTE) (Release 12).
S3-131023; 3GPP TSG SA WG3 (Security) Meeting #73; Intel; "GCSE discussion paper on the way forward for eMBMS security"; Nov. 11-15, 2013; San Francisco (US).
S2-134350 (revision of S2-134162); SA WG2 Meeting #100; NSN, Qualcomm Inc, ALU, Alcatel-Lucent; "Group management and user interaction for GCSE"; Nov. 11-15, 2013, San Francisco, USA.
International Search Report and Written Opinion dated Apr. 23, 2015, for corresponding International Appln. No. PCT/EP2015/050293.
NSN et al: "Group management and user interaction for GCSE"; 3GPP Draft; S2-134481 was 4350V3 was 162 GCSE Group MGT V4_Cypher (2); 3rd Generation Partnership Project (3GPP); Mobile Competence Centre; 650, Route des Lucioles; F-06921 Sophia-Antipolis Cedex; France; vol. SA WG2, No. San Francisco, USA; 20131111-20131115, Nov. 16, 2013; XP050765017, Retrived from the Internet: URL:http://www.3gpp.org/ftp/tsg_sa/WG2_Arch/TSGS2_100_San_Francisco/Docs/ [retrieved on Nov. 16, 2013]; p. 3, first paragraph; figure 1.
Michael Knappmeyer et al: "Advanced Multicast and Broadcast Content Distribution in Mobile Cellular Networks"; Global Telecommunications Conference, 2007; Globecom '07; IEEE; 3 Park Avenue; New York; NY 10016-5997; USA; Nov. 26, 2007, Apr. 30, 2015, pp. 2097-2101, XP031196329, DOI: 10.1109/ GLOCOM.2007.255; ISBN: 978-1-4244-1042-2; p. 2 left column, paragraph A; figure 1.

* cited by examiner

METHOD AND APPARATUS FOR ENHANCING COMMUNICATION SECURITY

BACKGROUND

1. Field

Embodiments of the invention relate to enhancing the security of protected communication.

2. Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method can include transmitting, by a group-communication-service-enabler application server, indicators to a network entity, wherein the indicators indicate whether security will be applied to a media data, whether security will be applied by an application layer, and whether security will be applied by an evolved-packet-system layer. The method can also include transmitting the media data to the network entity.

In the method of the first embodiment, the network entity comprises a broadcast-multicast-service-center.

In the method of the first embodiment, if the indicators indicate that the security will be applied by the application layer, the indicators also indicate that the security will be applied by the group-communication-service-enabler application server, and the security comprises encryption of the media data using a group key by the group-communication-service-enabler application server.

In the method of the first embodiment, if the indicators indicate that the security will be applied by the evolved-packet-system layer, the indicators further indicate that the security will be applied by the network entity.

In the method of the first embodiment, the transmitting the indicators comprises transmitting between a broadcast-multicast-service-center of the group-communication-service-enabler application server and a broadcast-multicast-service-center of an evolved-packet system.

According to a second embodiment, an apparatus can include at least one processor. The apparatus can also include at least one memory including computer program code. The at least one memory and the computer program code can be configured, with the at least one processor, to cause the apparatus at least to transmit indicators to a network entity. The indicators indicate whether security will be applied to a media data, whether security will be applied by an application layer, and whether security will be applied by an evolved-packet-system layer. The apparatus can also be caused to transmit the media data to the network entity.

In the apparatus of the second embodiment, the network entity includes a broadcast-multicast-service-center.

In the apparatus of the second embodiment, if the indicators indicate that the security will be applied by the application layer, the indicators also indicate that the security will be applied by the group-communication-service-enabler application server, and the security includes encryption of the media data using a group key by the group-communication-service-enabler application server.

In the apparatus of the second embodiment, if the indicators indicate that the security will be applied by the evolved-packet-system layer, the indicators further indicate that the security will be applied by the network entity.

In the apparatus of the second embodiment, the transmitting the indicators includes transmitting between a broadcast-multicast-service-center of the group-communication-service-enabler application server and a broadcast-multicast-service-center of an evolved-packet system.

According to a third embodiment, a computer program product can be embodied on a non-transitory computer readable medium. The computer program product can be configured to control a processor to perform a process, including transmitting, by a group-communication-service-enabler application server, indicators to a network entity. The indicators indicate whether security will be applied to a media data, whether security will be applied by an application layer, and whether security will be applied by an evolved-packet-system layer. The process can include transmitting the media data to the network entity.

According to a fourth embodiment, a method can include receiving, by a broadcast-multicast-service center, indicators from a network entity. The indicators indicate whether security will be applied to a media data, whether security will be applied by an application layer, and whether security will be applied by an evolved-packet-system layer. The method can also include receiving the media data from the network entity.

In the method of the fourth embodiment, the network entity includes a group-communication-service-enabler application server.

In the method of the fourth embodiment, if the indicators indicate that the security will be applied by the application layer, the indicators also indicate that the security will be applied by the group-communication-service-enabler application server, and the security comprises encryption of the media data using a group key by the group-communication-service-enabler application server.

In the method of the fourth embodiment, if the indicators indicate that the security will be applied by the evolved-packet-system layer, the indicators further indicate that the security will be applied by the network entity.

In the method of the fourth embodiment, the receiving the indicators comprises receiving from a broadcast-multicast-service-center of the group-communication-service-enabler application server.

According to a fifth embodiment, an apparatus can include at least one processor. The apparatus can also include at least one memory including computer program code. The at least one memory and the computer program code can be configured, with the at least one processor, to cause the apparatus at least to receive indicators from a network entity. The indicators indicate whether security will be applied to a media data, whether security will be applied by an application layer, and whether security will be applied by an evolved-packet-system layer. The apparatus can also be caused to receive the media data from the network entity.

In the apparatus of the fifth embodiment, the network entity includes a group-communication-service-enabler application server.

In the apparatus of the fifth embodiment, if the indicators indicate that the security will be applied by the application layer, the indicators also indicate that the security will be applied by the group-communication-service-enabler application server, and the security comprises encryption of the media data using a group key by the group-communication-service-enabler application server.

In the apparatus of the fifth embodiment, if the indicators indicate that the security will be applied by the evolved-packet-system layer, the indicators further indicate that the security will be applied by the network entity.

In the apparatus of the fifth embodiment, the receiving the indicators includes receiving from a broadcast-multicast-service-center of the group-communication-service-enabler application server.

According to a sixth embodiment, a computer program product can be embodied on a non-transitory computer readable medium. The computer program product can be configured to control a processor to perform a process including receiving, by a broadcast-multicast-service center, indicators from a network entity. The indicators indicate whether security will be applied to a media data, whether security will be applied by an application layer, and whether security will be applied by an evolved-packet-system layer. The process can also include receiving the media data from the network entity.

BRIEF DESCRIPTION OF THE DRAWINGS

For proper understanding of the invention, reference should be made to the accompanying drawings, wherein.

DETAILED DESCRIPTION

A Group-Communication-Service Enabler (GCSE) can be a service enabler for different types of group communication. One type of group communication can be critical communication that is transmitted to/from users in the public-safety sector. Specifications for GCSE are currently described within 3GPP TS 22.468 (for requirements), 3GPP TR 23.768 (for architecture), and 3GPP S3-131129 TR (for security).

When performing group communication, media data can be downloaded using broadcast/multicast technologies. Multicast/broadcast can be especially useful for distributing a same content to multiple users of a group. Multicast/broadcast can perform the distribution of the same content in a fast, efficient, and controlled manner.

According to 3GPP TS 22.468, GCSE should allow for flexible modes of operation. For example, GCSE is expected to support transmission of voice, video, and/or any other medium of data. Furthermore, GCSE in LTE is also expected to allow users to communicate data to several groups at the same time, in parallel. GCSE is also expected to provide modular functions and open interfaces that can be used to design Group Communication Services.

According to 3GPP TR 23.768, the GCSE_LTE work item description (WID) provides information relating to the following topics: (1) group communication among authorized/entitled group members via Evolved-Universal-Terrestrial-Radio-Access-Network (E-UTRAN), (2) group communication among authorized/entitled group members using E-UTRAN and/or proximity-services (ProSe) communication paths via a ProSe UE-to-Network Relay, and (3) the relationship between ProSe and GCSE when performing group communications.

While public-safety users (such as police personnel, fire department personnel, etc.) that transmit and receive critical communication will often have their own application server (AS) for group management, these users may want to use Multipoint Service (MuSe) functionality within an Evolved-Packet-System (EPS) network in LTE. These users may want to use MuSE functionality to efficiently distribute media data. As described by GCSE_LTE WID in 3GPP Release 12, MuSe functionality may be performed using Evolved Multimedia Broadcast Multicast Service (eMBMS).

Figure 1:
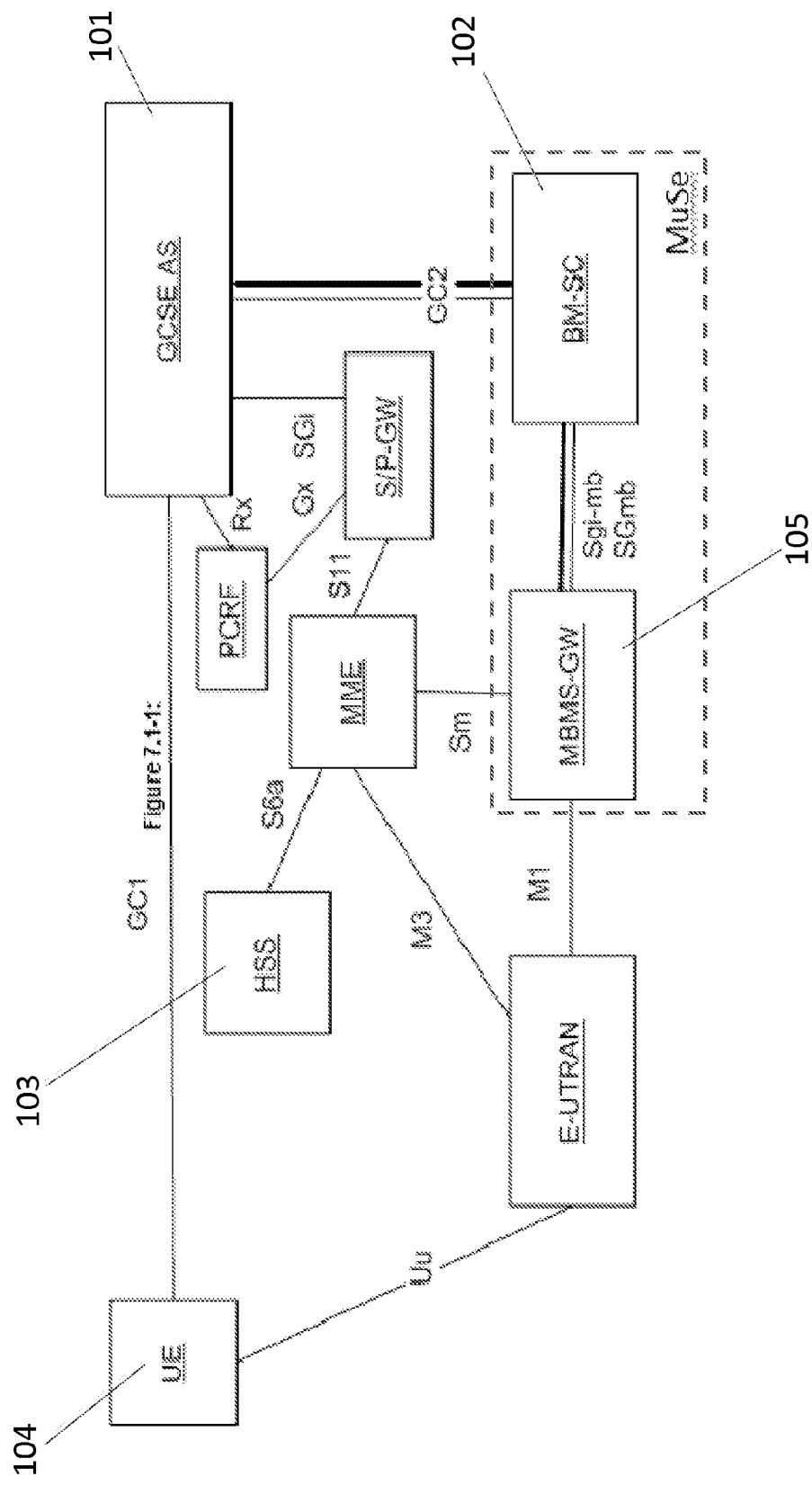
FIG. 1 illustrates a network configuration that comprises a Group-Communication-Service Enabler in accordance with embodiments of the present invention.

FIG. 1 illustrates a network configuration that comprises a GCSE in accordance with embodiments of the present invention. As illustrated by FIG. 1, the GC2 interface can be the interface between a GCSE AS 101 and a Broadcast-Multicast-Service-Center (BM-SC) 102. The BM-SC 102 can be used to define the interaction between the GCSE AS 101 and MuSe functionality provided by the 3GPP Evolved-Packet-Switched System (EPS) layer. The GC2 interface can be used to request the setup and usage of multipoint Service. 3GPP TR 23.768 also discusses proposals for switching between unicast and multicast technologies. The GC2 interface may include both user plane and control plane components.

eMBMS (as described within TS 22.146, 23.246, 26.346, and 33.246) allows broadcast and/or multicast of multimedia data to users located in a broadcast area. The broadcast media data can be received by any user within the area corresponding to the offered service. If users need to be subscribed/authorized to use the offered service, the broadcast media can be secured using security-related functionality. For example, when using eMBMS technology, users that have subscribed to the offered service will join a multicast group corresponding to the offered service. Next, although media data relating to the offered service can still be received by everybody in the addressed broadcast area, the multimedia data can only be understood (e.g., decrypted) by subscribed/authorized members of the multicast group. Details relating to eMBMS security are described in TS 33.246.

The BM-SC 102 can allocate a Temporary-Mobile-Group Identity (TMGI) to uniquely identify an offered service, such as a Multimedia Broadcast/Multicast Service (MBMS) Bearer Service, for example. As described above, if the offered service is to be secured against unauthorized use by unauthorized/unsubscribed users, security functionality can be applied to the media data of the offered service. For example, members of a TMGI group (a group of authorized members) may receive a group-service key (such as a Master-Session-Key (MSK)). The eMBMS specifications suggest using Generic-Bootstrapping Architecture (GBA) for the distribution of the group-service key MSK, which may need to be securely distributed to each authorized member (or to each user equipment (UE) of each authorized member). This secure distribution can be one-to-one communication, for example. For this distribution to work, each UE may have to first build its own unique secret MBMS user key (MUK), derived from Ciphering Keys (CK) and Integrity Keys (IK) available in the UE's Universal-Integrated-Circuit-Card (UICC). The secret MBMS user key (MUK) can also be known by a Home-Subscriber-Server (HSS) 103 so that the network can build its own reference of the MUK. The MUK can then be used by each user equipment 104 to retrieve the group service key MSK during the authorization process.

The GCSE AS 101 can also use any other way to distribute a group-service key (similar to group service key MSK) to each member of the group.

The MSK can be considered to be a long-term key for a group service. The MSK may not change very often. The MSK can be used to encrypt a short-term key, called the MBMS traffic key (MTK). The MTK can be used for media encryption. The BM-SC sends encrypted media data (encrypted by MTK) together with the encrypted MBMS traffic key (encrypted by the MSK) via the MBMS-GW 105 to user-equipment/terminals within a broadcast area. The broadcast area can be the area corresponding to the scope of the broadcast of the offered service.

The BM-SC 102 can serve as an entry point for content providers or for any other broadcast/multicast source. The broadcast/multicast source can be external to the network. For example, with GCSE, content may be provided by the GCSE AS 101. The BM-SC 102 can be connected to the MBMS Gateway (MBMS GW) 105, which is responsible for MBMS session management (such as providing "Session Start" and "Session Stop" management). The MBMS GW 105 can broadcast the packets of incoming broadcast/multicast traffic (incoming from the GCSE AS 101) to all evolved Node Bs (eNBs) within a service area. The MBMS GW 105 can also collect charging information relating to the distributed MBMS traffic for each UE/terminal 104 having an active MBMS session.

The BM-SC 102 can provide authorization for UE/terminals that request activation of an offered MBMS service and for UE/terminals that schedule broadcast and multicast sessions. The BM-SC 102 can provide integrity and protection of MBMS data, if needed. The BM-SC 102 can also be responsible for MBMS session announcements.

The SGmb interface supports MBMS-bearer signalling for setting up and releasing context at the time of MBMS-session establishment and/or termination. The SGmb interface also supports user-related signalling. User-related signalling can be signalling relating to multicast-session authorization, signalling relating to user-session joining, or signalling relating to user-session detaching. The SGi-mb interface can be an interface that supports the MBMS traffic plane.

Some uses of GCSE (e.g., very confidential public safety use cases) may require that end-to-end encryption at an application layer may be needed. When using end-to-end encryption, entities in the telecommunication-operator network may not be permitted to know the multicast media data. However, the entities may only need to be restricted from knowing very critical information. In many situations, merely using eMBMS security to encrypt the media stream is not a problem, in which case the AS trusts the telecommunication operator to not leak any information. Double encryption, as described in SA2 pCR 134350, appears to not be a good way forward because Secure-Real-Time-Transport-Protocol (SRTP) over SRTP would likely need additions to the related Request-For-Comments (RFC).

Embodiments of the present invention are directed to a method and apparatus for indicating information to a network operator (a network operator within an EPS layer, for example). The information may relate to security measures that are used to perform a multipoint service that is implemented by a GCSE operator (within the AS layer). Examples of security measures to be applied have been described above. In one embodiment, the function of providing security measures can be split between different devices. Different possible architectures may be used, and these different possible architectures can be discussed as a part of the implementation details.

As described above, in embodiments of the present invention, a multipoint service for GCSE can be implemented using eMBMS in 3GPP Release 12. eMBMS also has security mechanisms that are specified. When transmitting/receiving critical communication, the GCSE service will most likely not be operated by the telecommunication operator. The GCSE service operator may want to apply security that is already at the application layer.

Figure 2:
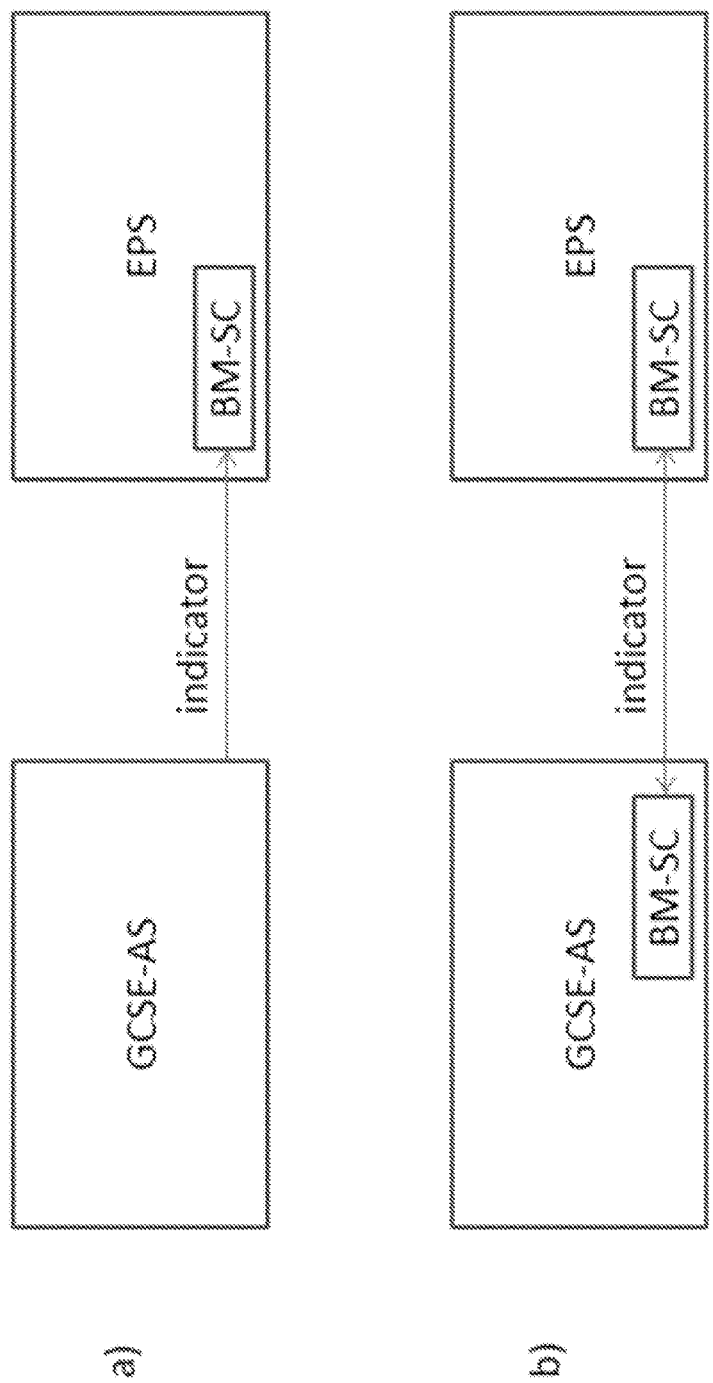
FIG. 2 illustrates transmitting an indicator in accordance with embodiments of the present invention.

FIG. 2 illustrates transmitting an indicator in accordance with embodiments of the present invention. In embodiments of the present invention, as shown in FIG. 2(a), an indicator/flag can be sent from the GCSE AS over the GC2 interface to instruct the BM-SC about which security features have been applied by the GCSE AS and/or what needs to be done by the BM-SC in terms of security. The features in question include, but are not limited to, generation and distribution of MTK and MSK, membership management and UE authorization. Alternatively, as shown in FIG. 2(b), the application of security functionality may be split between the GCSE AS and the BM-SC. Specifically, a BM-SC of the GCSE-AS may communicate with a BM-SC of an EPS, as described in more detail below.

However, from a security point of view, it may be more appropriate to apply a complete security solution by only one of the BM-SC or the GCSE AS entities. For example, if the GCSE AS wants to use end-to-end encryption, the GCSE AS may indicate to the BM-SC that security has already been applied by the GCSE AS. If the GCSE AS does not demand end-to-end encryption, but still would like the BM-SC to protect the data on behalf of the GCSE AS, the GCSE AS may need to indicate this request to the BM-SC.

Embodiments of the present invention can use one or more indicators/flags during a communication step that communicates security communication via the GC2 interface. The communication step can indicate, to the BM-SC, what needs to be done with respect to security. Furthermore, a data field content that needs to be transferred via the GC2 interface can be described as part of this indication mechanism.

Furthermore, depending on which entity is in which domain, different embodiments are possible depending on the architecture setting. Currently, the GCSE AS can be within the application-operator domain, and the MBMS-GW can be within the telecommunication-operator domain. However, the GCSE AS operator may alternatively decide to run its own MBMS service, in order to have certain functionality within the domain of the GCSE AS. In this case, the BM-SC of the AS (AS_BM-SC) may need to communicate with the domain of the telecommunication operator (in which case the GCSE AS may need to indicate this communication to the telecommunication operator domain). Thus, in another embodiment, one or more indicators/flags can provide signaling between two BM-SCs (signaling between the BM-SC in the domain of the AS operator and the BM-SC in the domain of the telecommunication operator). Alternatively, one or more indicators/flags can indicate, to a BM-SC, whether security has already been fully or partially applied. Although the latter configuration would generally not arrange security in only one place, the latter configuration can be more efficient in some circumstances. The latter model may depend on the trust model, as shown in FIG. 2(b).

As described above, embodiments of the present invention can use an indication/flag. The different embodiments can be configured based on which entity is in which domain, and different embodiments can be configured based upon which functionality is taken over by which entity.

Figure 3:
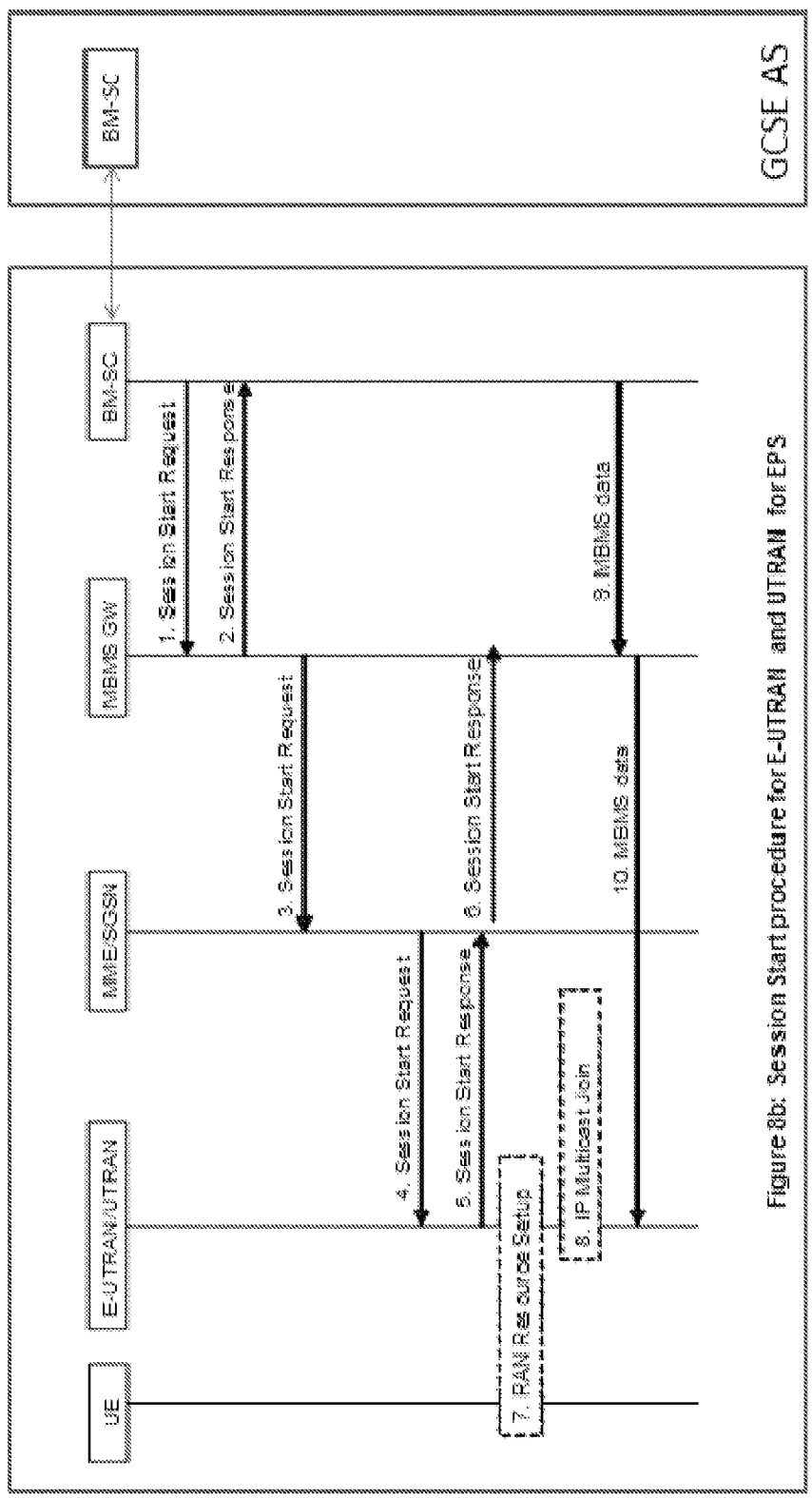
FIG. 3 illustrates a process of transmitting communication in accordance with embodiments of the present invention.

FIG. 3 illustrates a process of transmitting communication in accordance with embodiments of the present invention. As shown in FIG. 3, communication is transmitted between UE, E-UTRAN/UTRAN, MME/SGSN, MBMS GW, and BM-SC. Specifically, as illustrated by FIG. 3, a BM-SC of a GCSE AS can be in communication with a BM-SC of an EPS.

Figure 4:
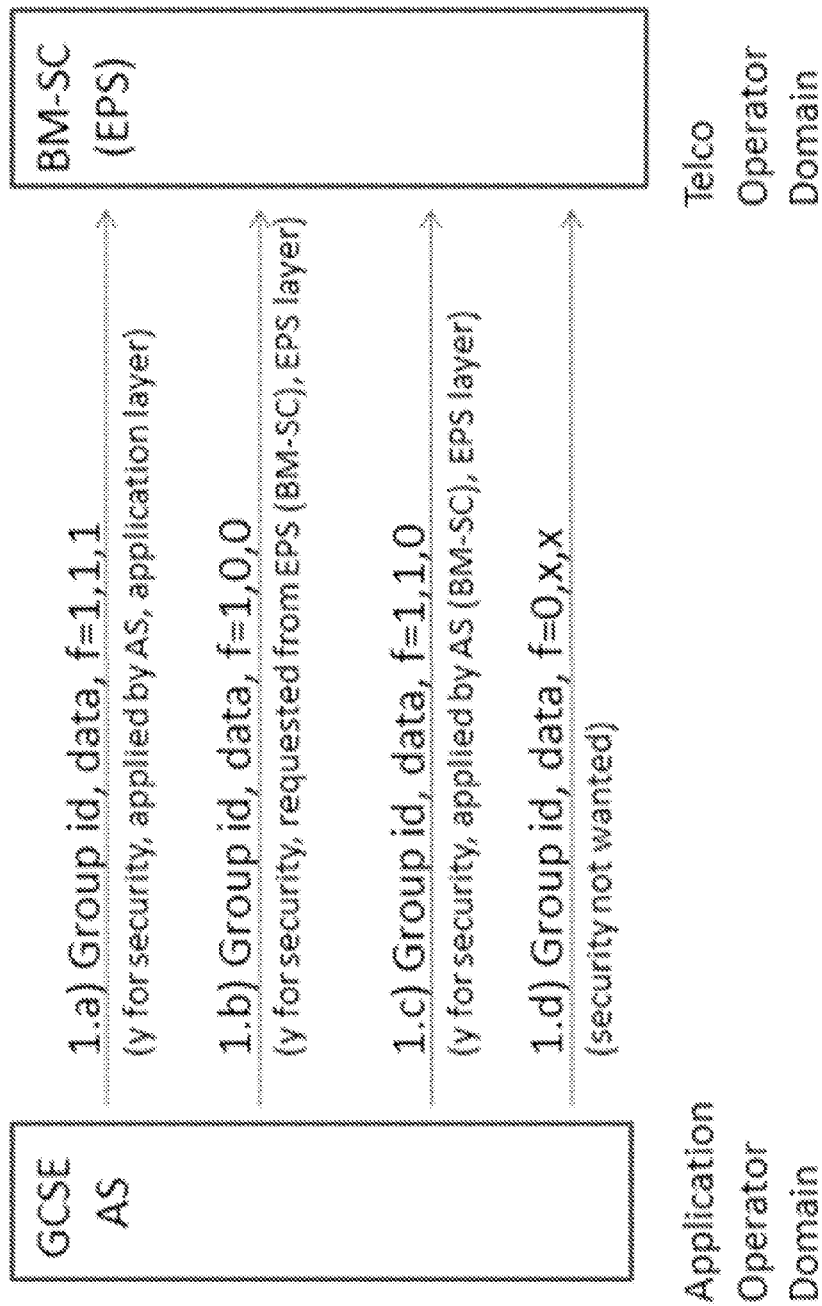
FIG. 4 illustrates transmitting communication between a Group-Communication-Service-Enabler Application Server (GCSE AS) and a Broadcast-Multicast-Service-Center (BM-SC) in accordance with embodiments of the present invention.

FIG. 4 illustrates transmitting communication between a GCSE AS and a BM-SC in accordance with embodiments of the present invention. In one embodiment, an AS is in the domain of a GCSE operator, and an BM-SC is in the domain of a telecommunication operator.

As shown by (1.a), the GCSE AS can encrypt media data. The indicator can indicate "Y" (i.e., "yes") for security. Key management can be completed outside of the GC2 interface. In this embodiment, only a group key (such as an MSK) may be used for the encryption. As such, embodiments of the present invention can indicate that the security will be applied to media data by the AS. BM-SC may be used as a pipeline to broadcast the encrypted data. In one embodiment, only members of the group that hold the group key (MSK) can use the group key for decryption of the media data. In this embodiment, the group key may not be known by the BM-SC. The BM-SC may not use security mechanisms itself. The AS may indicate to the BM-SC that the BM-SC should just broadcast the media data because the group key (MSK) has already been received by the terminals/UEs by different means, and no MTK is used by the terminals/UEs. By using embodiments of the present invention, management of security may be out of the scope of a telecommunication operator.

As shown by (1.b), the indicator can again indicate "yes" to the application of security. However, unlike (1.a) above, the GCSE AS can delegate to the BM-SC to perform the application of security to the media data. In one embodiment, the BM-SC may not change the group membership, and the BM-SC may merely maintain the link between the media data and the group identifier (TMGI) of the users/terminals that are authorized to receive and decrypt the transmitted media data. In another embodiment, if GCSE AS takes care of the group membership, BM-SC may need to send the group key (MSK) via GC2 to the GCSE AS for distribution to the UEs. As shown by (1.b), the indicator can indicate that the BM-SC should fulfill a traditional role of MTK/MSK generation and distribution, and/or UE authentication, for example. The GCSE AS can act as a content provider. As shown by (1.c), the GCSE AS may want to achieve a similar level of security as the MBMS. The GCSE AS may generate MTKs for segments of the media data. The MTKs can be encrypted by a group key and can be attached to the MTK-encrypted media-data segments. This bundle can be sent to the BM-SC. The BM-SC can be seen as a pipeline. The GCSE AS indicates to the BM-SC that MSK and MTKs are used and that the BM-SC can deliver the data in the same way as it would have done with its own created MSK/MTKs. In one embodiment, the GCSE AS can use the same formats and fields that the BM-SC would use, as if the GCSE AS had provided the security itself.

As shown by (1.d), in the event that no security is desired, security may not be applied by the GCSE AS. In these situations, an indicator corresponding to "no security is applied" may be used. Therefore, the GCSE AS may need to indicate this indicator to the BM-SC as well. With the example indicator setting, only the first flag may need to be looked at. If this example indicator setting is "0", the other flags do not need to be evaluated.

Figure 5:
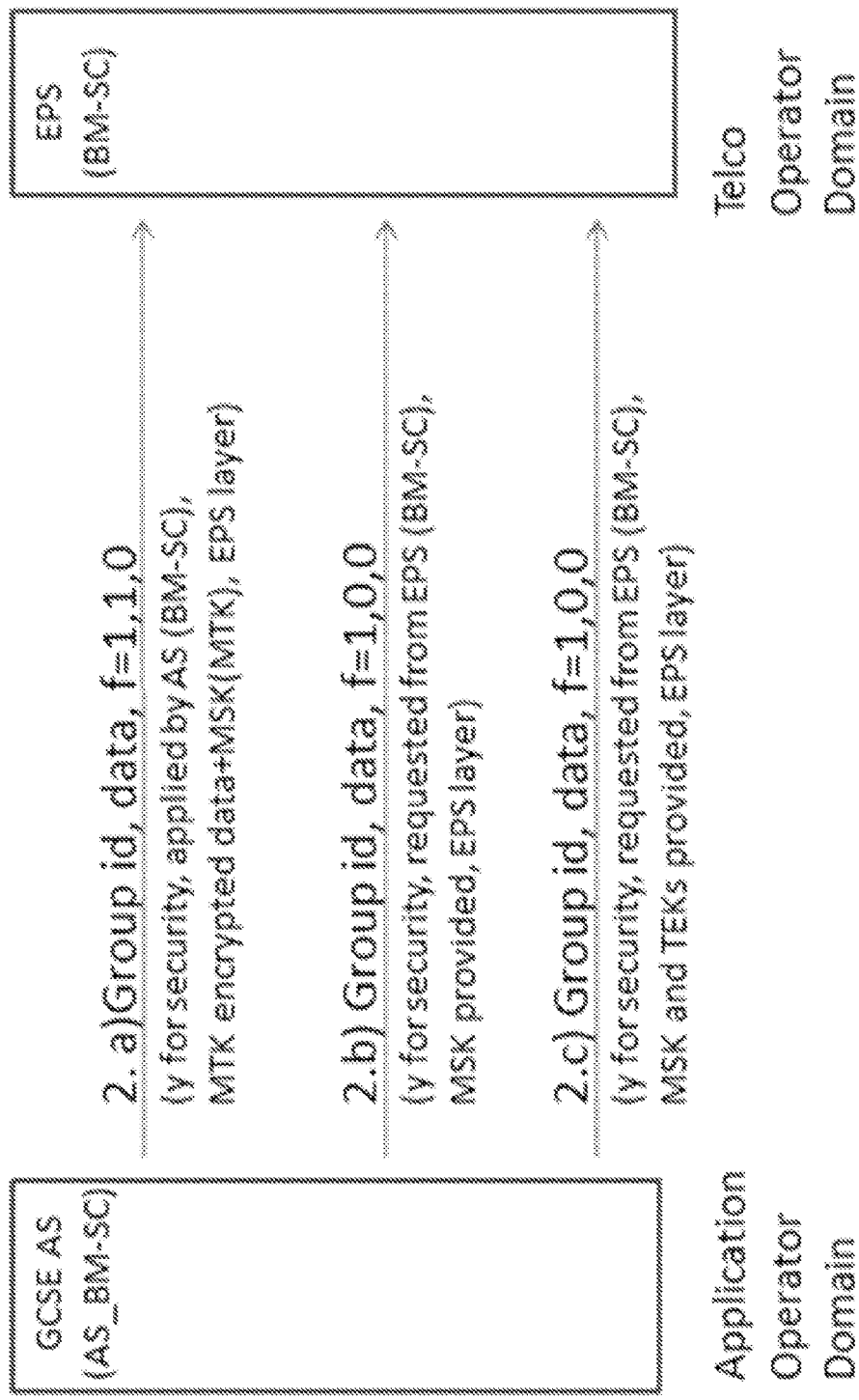
FIG. 5 illustrates transmitting communication between a GCSE AS and a BM-SC in accordance with another embodiment of the present invention.

FIG. 5 illustrates transmitting communication between a GCSE AS and a BM-SC in accordance with another embodiment of the present invention. In another embodiment, the GCSE AS can operate as its own BM-SC (AS_BM-SC), and the telecommunication operator also has its own BM-SC. Information may need to be transferred between the GCSE AS and the BM-SC or between two BM-SCs. As described above, if the information is transferred between two BM-SCs, one BM-SC may be in the domain of the AS, the other BM-SC may be in the domain of the telecommunication operator. This configuration can be similar to the configuration of (1c) as shown in FIG. 4, but several variations can be possible. which assumes trust between the AS operator and the telecommunication operator, because key material is provided by the AS_BM-SC to the BM-SC. It should be noted that AS_BM-SC can supply full functionality as BM-SC or only partial functionality, if not very limited, e.g., generating a group key (MSK) and transferring it via GC2 interface to BM-SC.

According to (2.a), one embodiment can use an indicator between the GCSE AS and the BM-SC. The indicators can indicate whether AS_BM-SC functionality is to be used. The indicators can instruct the 3GPP-operated BM-SC to only transfer what the BM-SC receives. In this embodiment, additional fields can be used in conjunction with the GC2 interface, for example, to indicate that MTK and MSK have been generated by the AS or BM-SC of the AS (AS_BM-SC).

According to (2.b), the GCSE AS can generate a group key MSK. The GCSE AS can perform all of the membership management. The GCSE AS may trust the telecommunication operator and can provide the group key MSK. The telecommunication operator's BM-SC can generate MTKs and can apply them to the data segments, sending the encrypted data together with the encrypted MTKs. In embodiments of the present invention, the GCSE AS can perform all management functions related to membership and group-key delivery. The BM-SC can perform all functions related to MBMS, using the provided MSK.

According to (2.c), the GCSE AS may apply security, and can perform complete membership and key management, and the GCSE AS may provide all keys (MSK and the MTKs) together with the data and the relevant group identifiers (IDs) to the BM-SC. The BM-SC can be in the domain of the telecommunication operator and can perform the data packaging (can perform encryption, for example) with the provided keys.

These message exchanges can exchange sequences that are needed between GCSE_AS and BM-SC before a BM-SC Session and Transmission Function can start a session for MBMS data transmission. These messages can be found after or alongside the request of establishment of a new multicast group or as a part of a sequence renewing parameters of an existing multicast group.

Additional flags may be added later to the message to further describe the role of each entity with regard to security functions.

Figure 6:
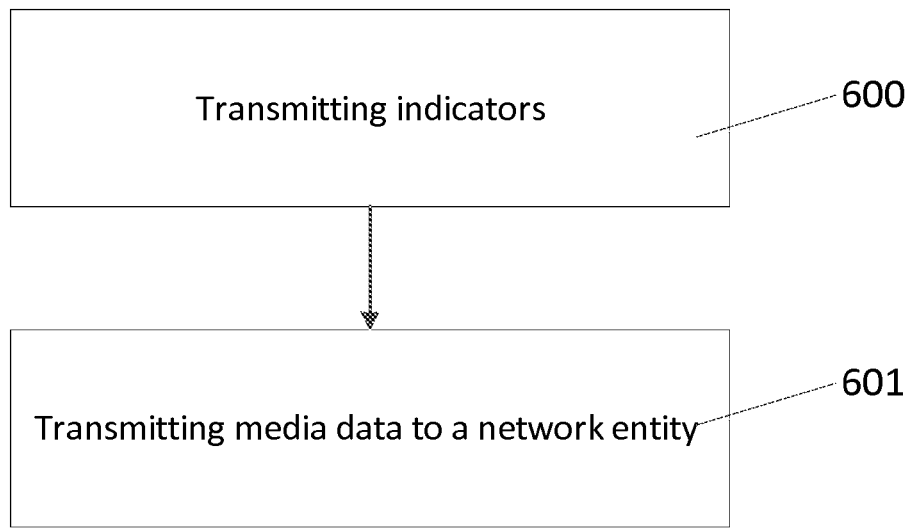
FIG. 6 illustrates a flowchart of a method in accordance with embodiments of the invention.

FIG. 6 illustrates a flowchart of a method in accordance with embodiments of the invention. The method illustrated in FIG. 6 includes, at 600, transmitting, by a group-communication-service-enabler application server, indicators to a network entity. The indicators indicate whether security will be applied to a media data, whether security will be applied by an application layer, and whether security will be applied by an evolved-packet-system layer. The method can also include, at 601, transmitting the media data to the network entity.

Figure 7:
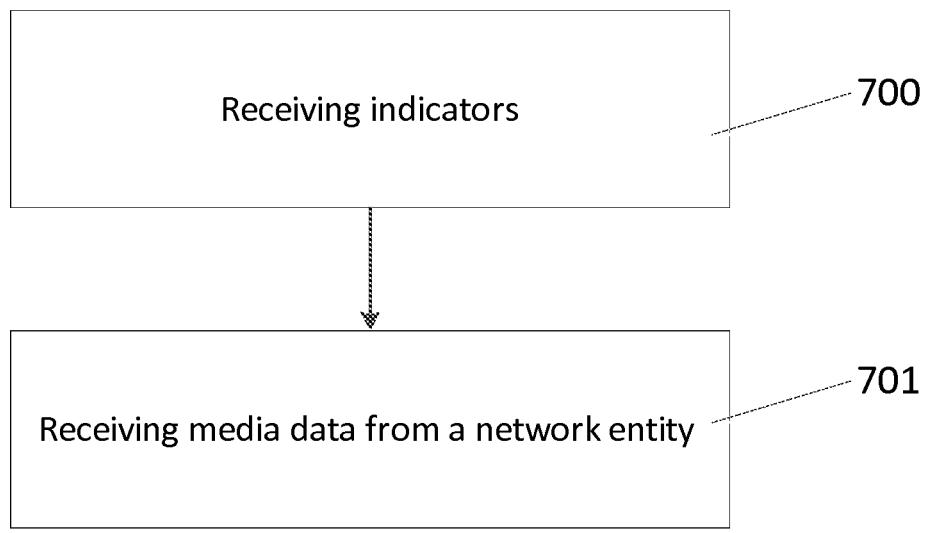
FIG. 7 illustrates a flowchart of a method in accordance with embodiments of the invention.

FIG. 7 illustrates a flowchart of a method in accordance with embodiments of the invention. The method illustrated in FIG. 7 includes, at 700, receiving, by a broadcast-multicast-service center, indicators from a network entity. The indicators indicate whether security will be applied to a media data, whether security will be applied by an application layer, and whether security will be applied by an evolved-packet-system layer. The method also includes, at 701, receiving the media data from the network entity.

Figure 8:
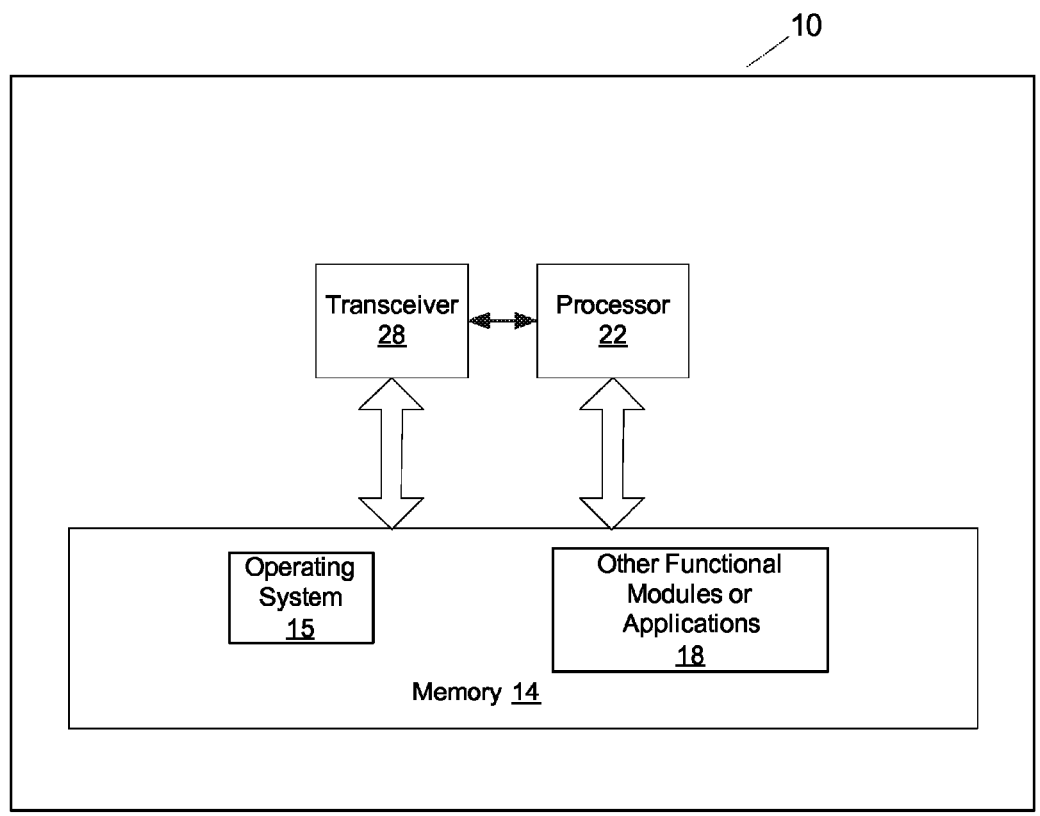
FIG. 8 illustrates an apparatus in accordance with embodiments of the invention.

FIG. 8 illustrates an apparatus in accordance with embodiments of the invention. In one embodiment, the apparatus can be a network entity such as a GCSE AS. In one embodiment, the apparatus can be a BM-SC. Apparatus 10 can include a processor 22 for processing information and executing instructions or operations. Processor 22 can be any type of general or specific purpose processor. While a single processor 22 is shown in FIG. 8, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
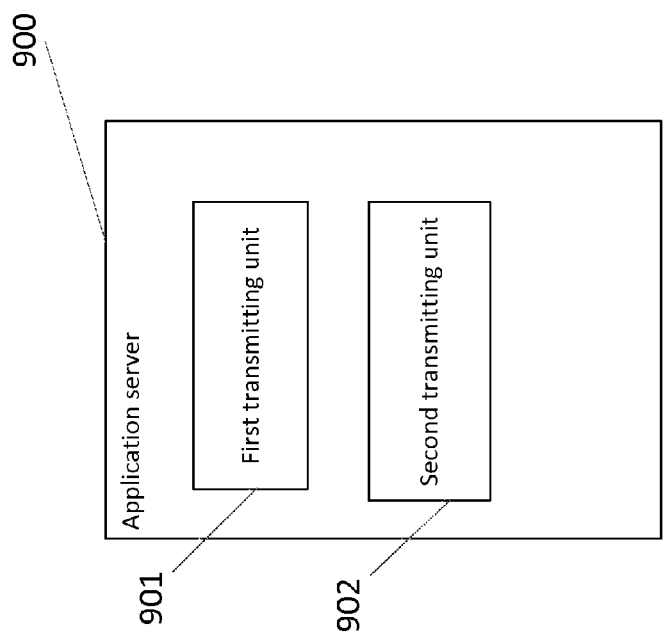
FIG. 9 illustrates an apparatus in accordance with embodiments of the invention.

FIG. 9 illustrates an apparatus in accordance with embodiments of the invention. Apparatus 900 can be a network entity such as an application server, for example. In one embodiment, apparatus 900 can be a group-communication-service-enabler application server. Apparatus 900 can include a first transmitting unit 901 that transmits indicators to a network entity. The indicators indicate whether security will be applied to a media data, whether security will be applied by an application layer, and whether security will be applied by an evolved-packet-system layer. Apparatus 900 can also include a second transmitting unit 902 that transmits the media data to the network entity.

Figure 10:
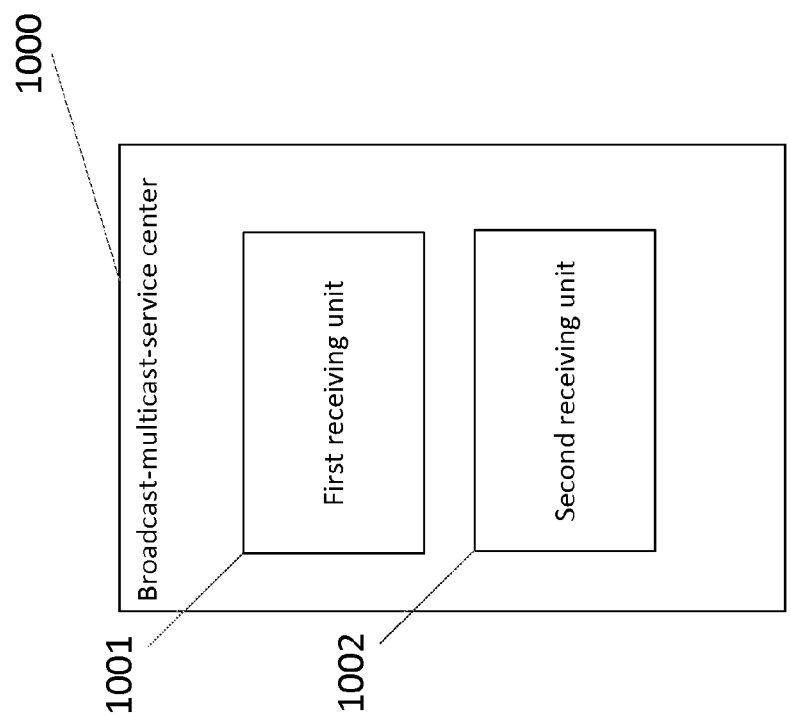
FIG. 10 illustrates an apparatus in accordance with embodiments of the invention.

FIG. 10 illustrates an apparatus in accordance with embodiments of the invention. Apparatus 1000 can be a broadcast-multicast-service center, for example. Apparatus 1000 can include a first receiving unit 1001 that receives indicators from a network entity. The indicators indicate whether security will be applied to a media data, whether security will be applied by an application layer, and whether security will be applied by an evolved-packet-system layer. Apparatus 1000 can also include a second receiving unit 1002 that receives the media data from the network entity.

Figure 11:
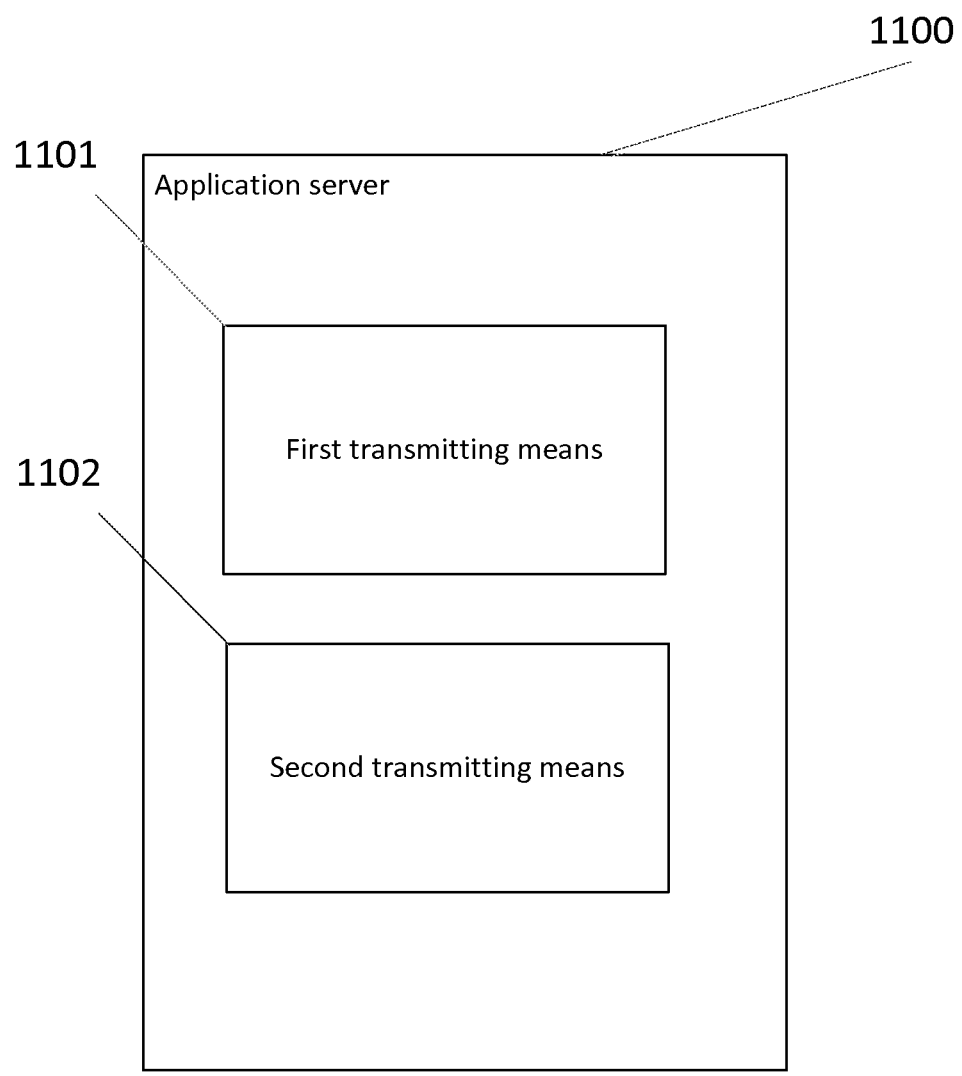
FIG. 11 illustrates an apparatus in accordance with embodiments of the invention.

FIG. 11 illustrates an apparatus in accordance with embodiments of the invention. Apparatus 1100 can be a network entity such as an application server, for example. In one embodiment, apparatus 1100 can be a group-communication-service-enabler application server. Apparatus 1100 can include a first transmitting means 1101 for transmitting indicators to a network entity. The indicators indicate whether security will be applied to a media data, whether security will be applied by an application layer, and whether security will be applied by an evolved-packet-system layer. Apparatus 1100 can also include a second transmitting means 1102 for transmitting the media data to the network entity.

Figure 12:
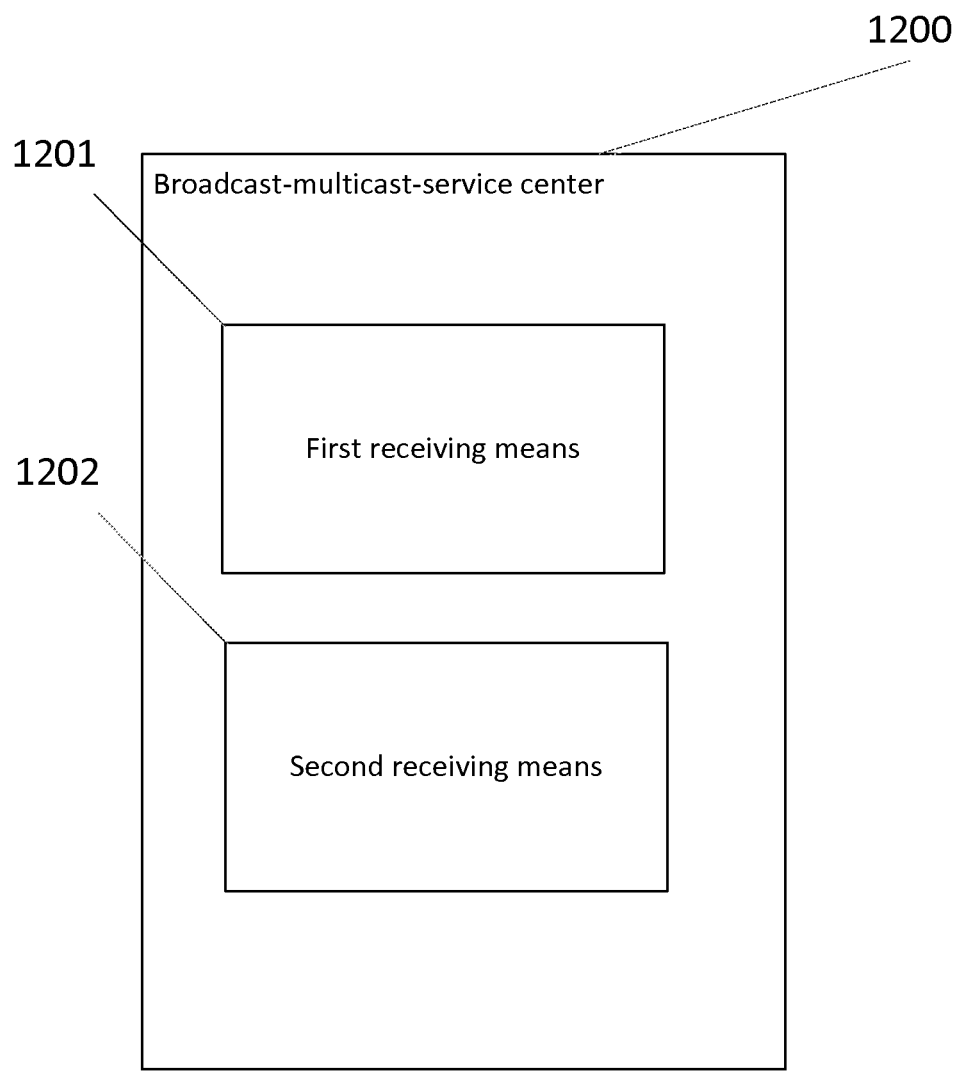
FIG. 12 illustrates an apparatus in accordance with embodiments of the invention.

FIG. 12 illustrates an apparatus in accordance with embodiments of the invention. Apparatus 1200 can be a broadcast-multicast-service center, for example. Apparatus 1200 can include a first receiving means 1201 for receiving indicators from a network entity. The indicators indicate whether security will be applied to a media data, whether security will be applied by an application layer, and whether security will be applied by an evolved-packet-system layer. Apparatus 1200 can also include a second receiving means 1202 for receiving the media data from the network entity.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
    transmitting, by a group-communication-service-enabler application server, indicators to a network entity, wherein the indicators indicate whether security will be applied to a media data, whether security will be applied by an application layer, and whether security will be applied by an evolved-packet-system layer; and
    transmitting the media data to the network entity, wherein the network entity comprises a broadcast-multicast-service center, and the indicators and the media data are transmitted from the group-communication service-enabler application server to the broadcast-multicast-service center.

2. The method according to claim 1, wherein, if the indicators indicate that the security will be applied by the application layer, the indicators also indicate that the security will be applied by the group-communication-service-enabler application server, and the security comprises encryption of the media data using a group key by the group-communication-service-enabler application server.

3. The method according to claim 1, wherein, if the indicators indicate that the security will be applied by the evolved-packet-system layer, the indicators further indicate that the security will be applied by the network entity.

4. The method according to claim 1, wherein the transmitting the indicators comprises transmitting between a broadcast-multicast-service-center of the group-communication-service-enabler application server and a broadcast-multicast-service-center of an evolved-packet system.

5. An apparatus, comprising:
    at least one processor; and
    at least one memory including computer program code,
    the at least one memory and the computer program code configured, with the at least one processor, to cause the apparatus at least to
    transmit indicators to a network entity, wherein the indicators indicate whether security will be applied to a media data, whether security will be applied by an application layer, and whether security will be applied by an evolved-packet-system layer; and
    transmit the media data to the network entity, wherein the apparatus comprises a group-communication-service-enabler application server, the network entity comprises a broadcast-multicast-service center, and the indicators and the media data are transmitted from the group-communication-service-enabler application server to the broadcast-multicast-service center.

6. The apparatus according to claim 5, wherein, if the indicators indicate that the security will be applied by the application layer, the indicators also indicate that the security will be applied by the group-communication-service-enabler application server, and the security comprises encryption of the media data using a group key by the group-communication-service-enabler application server.

7. The apparatus according to claim 5, wherein, if the indicators indicate that the security will be applied by the evolved-packet-system layer, the indicators further indicate that the security will be applied by the network entity.

8. The apparatus according to claim 5, wherein the transmitting the indicators comprises transmitting between a broadcast-multicast-service-center of the group-communication-service-enabler application server and a broadcast-multicast-service-center of an evolved-packet system.

9. A computer program product, embodied on a non-transitory computer readable medium, the computer program product configured to control a processor to perform a process, comprising:
    transmitting, by a group-communication-service-enabler application server, indicators to a network entity, wherein the indicators indicate whether security will be applied to a media data, whether security will be applied by an application layer, and whether security will be applied by an evolved-packet-system layer; and
    transmitting the media data to the network entity, wherein the network entity comprises a broadcast-multicast-service center, and the indicators and the media data are transmitted from the group-communication-service-enabler application server to the broadcast-multicast-service center.

10. A method, comprising:
    receiving, by a broadcast-multicast-service center, indicators from a network entity, wherein the indicators indicate whether security will be applied to a media data, whether security will be applied by an application layer, and whether security will be applied by an evolved-packet-system layer; and
    receiving the media data from the network entity, wherein the network entity comprises a group-communication-service-enabler application server, and the indicators and the media data are transmitted from the group-communication-service-enabler application server to the broadcast-multicast-service center.

11. The method according to claim 10, wherein, if the indicators indicate that the security will be applied by the application layer, the indicators also indicate that the security will be applied by the group-communication-service-enabler application server, and the security comprises encryption of the media data using a group key by the group-communication-service-enabler application server.

12. The method according to claim 10, wherein, if the indicators indicate that the security will be applied by the evolved-packet-system layer, the indicators further indicate that the security will be applied by the network entity.

13. The method according to claim 10, wherein the receiving the indicators comprises receiving from a broadcast-multicast-service-center of the group-communication-service-enabler application server.

14. An apparatus, comprising:
    at least one processor; and
    at least one memory including computer program code,
    the at least one memory and the computer program code configured, with the at least one processor, to cause the apparatus at least to
    receive indicators from a network entity, wherein the indicators indicate whether security will be applied to a media data, whether security will be applied by an application layer, and whether security will be applied by an evolved-packet-system layer; and
    receive the media data from the network entity, wherein the network entity comprises a group-communication-service-enabler application server, the apparatus comprises a broadcast-multicast-service center, and the indicators and the media data are transmitted from the group-communication-service-enabler application server to the broadcast-multicast-service center.

15. The apparatus according to claim 14, wherein, if the indicators indicate that the security will be applied by the application layer, the indicators also indicate that the security will be applied by the group-communication-service-enabler application server, and the security comprises encryption of the media data using a group key by the group-communication-service-enabler application server.

16. The apparatus according to claim 14, wherein, if the indicators indicate that the security will be applied by the evolved-packet-system layer, the indicators further indicate that the security will be applied by the network entity.

17. The apparatus according to claim 14, wherein the receiving the indicators comprises receiving from a broadcast-multicast-service-center of the group-communication-service-enabler application server.

18. A computer program product, embodied on a non-transitory computer readable medium, the computer program product configured to control a processor to perform a process, comprising:
    receiving, by a broadcast-multicast-service center, indicators from a network entity, wherein the indicators indicate whether security will be applied to a media data, whether security will be applied by an application layer, and whether security will be applied by an evolved-packet-system layer; and
    receiving the media data from the network entity, wherein the network entity comprises a group-communication-service-enabler application server, and the indicators and the media data are transmitted from the group-communication-service-enabler application server to the broadcast-multicast-service center.

* * * * *